Patented July 28, 1942

2,291,403

UNITED STATES PATENT OFFICE 2,291,403

HALOGENATED HYDROCARBON PRODUCT

Arnold J. Morway, Clark Township, Union County, and Floyd L. Miller, Roselle Park, N. J., assignors, by mesne assignments, to Jasco, Incorporated, a corporation of Louisiana No Drawing. Application December 31, 1938, Serial No. 248,868

11 Claims. (Cl. 260—772)

This invention relates to high molecular weight halogenated organic compounds and methods of preparing same. More particularly, it relates to the halogenation of high molecular weight hydrocarbon polymers such as those produced by the polymerization of isobutylene at low temperature, generally below 0° C. and preferably as low as —10°, —20° C., or even —80° C., in the presence of boron fluoride or other halide polymerizing catalyst effective at such low temperature.

It has been discovered that such polymers, which may range from 1,000 or so up to 15,000, 20,000 or even 250,000 or more in moleclular weight (determined by the viscosity method described in Staudinger's book, "Die Hochmolekularen Organischem Verbindungen," H. Staudinger Berlin 1932 Verlag Von Julius Stringer, page 56), are very stable and relatively inert chemical compounds, being substantially completely saturated with respect to hydrogen and having a very low iodine number, e. g. about 7 or less. Generally, the higher the molecular weight the more chemically inert are these polymers. For instance, they are substantially not affected by sulfuric acid and they are very resistant to oxidation, sulfurization, and many other chemical treatments. They differ from rubber which is quite unsaturated in that they cannot be vulcanized by sulfur while rubber can, and in that they are soluble in all proportions in petroleum hydrocarbons, such as naphtha, kerosene and lubricating oils, causing an increase in the true viscosity and viscosity index thereof, while rubber forms a gel (merely swells) in those liquids.

Other similar materials which may be treated according to this invention include any similar substantially saturated high molecular weight polymers which may be considered to have a chemical structure corresponding to that of a very long chain of carbon atoms containing occasional side chains of alkyl groups, such as methyl, ethyl, etc. Besides isobutylene, other isoolefines, such as iso-amylene, may be polymerized at low temperature, to produce high molecular weight polymers for use as raw material for this invention. Although the above type of material is preferred, other materials believed to have a substantially similar chemical structure but formed in other ways may be used in some instances, for example, "hydro-rubber" (which is produced by destructive hydrogenation of rubber and is entirely different from the parent substance in its properties and behavior). It is preferred to use rubber which has been subjected to hydrogenation under conditions such as to cause substantially complete saturation of the double bonds present in the natural rubber.

Depending upon the hydrogenation conditions, particularly the temperature, there may be a certain amount of degradation of the original rubber molecules. For instance, if the hydrogenation is carried out at fairly elevated temperatures, e. g. 150 or 200° C., a rubber originally having a molecular weight of 120,000–300,000 or higher will be converted into a hydrorubber having a molecular weight of perhaps 50,000–100,000 or higher; or, in some cases, the hydro-rubber may have a molecular weight as low as 10,000 or 15,000, depending on the initial temperature or reaction.

A sample of hydro-rubber having an average molecular weight of about 40,000 (as determined by the viscosity method) was found to have an iodine number of 9.8 cgs.I/gm.; this is substantially saturated compared to the natural rubber (unhydrogenated) which has an iodine number generally in the vicinity of 300 or 350 and yet this iodine number of 9.8 for the hydro-rubber is not quite as low as that of a polyisobutylene having substantially the same molecular weight of 40,000 (iodine number about 2 or 3).

Instead of hydrogenated derivatives of natural rubber, similar derivatives of hydrogenated synthetic rubbers such as polymers of diolefins such as butadiene or isoprene and the like may be used.

According to the present invention, high molecular weight halogenated compounds are prepared by contacting a halogen with a solution of a high molecular weight hydrocarbon of the structure described. The solvent to be used may be any one which is non-reactive with the halogen being used or which, if reactive therewith, will not cause any harmful effect on the high molecular weight product. Carbon tetrachloride has been found very suitable. Other solvents, such as sulfur halides, etc., may be used. The solvents must be sufficiently fluid that a solution of the high molecular weight hydrocarbon therein will not be too viscous for treatment with the halogen under the conditions of treatment. The halogen to be used may be any one of the four, i. e. fluorine, chlorine, bromine or iodine, although chlorine is the cheapest and most practical.

The halogenation may be carried out at room temperature or elevated temperature, such as up to 50° C. or 100° C., but should not be too high inasmuch as halogenation at an excessively high temperature will cause excessive breakdown of the molecular weight of the product. The halogenation may be carried out at atmospheric pressure or considerably higher pressures, such as 5 to 50 or 100 atmospheres or more, especially when carrying out the reaction at low temperature. The halogenation is preferably carried out in the presence of strong light such as ultra-violet or preferably direct sunlight, although it will proceed at a slower rate in diffused light and even to a slight extent in total darkness, particularly when chemical compounds having a catalytic effect are used, such as iodine, stannic chloride, etc. If desired, the halogenation may be carried out in the presence of peroxides, e. g. benzoyl peroxide, to direct the halogen atoms preferentially to the alpha (end) carbon atoms in hydrocarbon molecules. The percent of halogen incorporated depends upon the duration of the treatment. Generally, it is desirable to incorporate from 10% to 20% of halogen, although as little as 1% and as much as 50%, 60%, or even 70% or so may be incorporated if desired.

Various methods may be used for treating the high molecular weight hydrocarbon with the halogen. For example, chlorine may be bubbled through a carbon tetrachloride solution of the high molecular weight polymer or chlorine may be subjected to a countercurrent spray of a solution of the polymer. Another alternative is to carry out the halogenation treatment in the presence of bases, e. g. calcium or magnesium oxides or carbonates, sodium carbonate or bicarbonate, etc., or over water containing an insoluble carbonate, such as calcium carbonate or magnesium carbonate, for the purpose of absorbing hydrogen chloride liberated by the reaction.

If desired, instead of first preparing the polymer in relatively pure form and then dissolving it in a suitable solvent, such as carbon tetrachloride, and passing chlorine through this solution, the original polymerization of isobutylene, for example, may be carried out in the presence of carbon tetrachloride or other solvent which will be suitable for the halogenation and then as soon as the polymerization process is completed the solution of the high molecular weight polymer may be treated immediately with a desired halogen, thereby avoiding the removal of the solvent used during the polymerization step and subsequent redissolving of the polymer in a solvent for the halogenation step.

If desired, after the halogenation has been completed, the solution may be blown with air or inert gas, such as nitrogen or hydrogen, at a slightly elevated temperature, but preferably not above 100° C., in order to remove hydrogen chloride. Any traces still remaining may be removed by further blowing the liquid with ammonia, or other volatile amine, alone or mixed with air or inert gas, preferably at room temperature or perhaps up to 40° C. or 50° C.

As an alternative, the product may be washed one or more times with dilute alkali, such as caustic soda, in order to remove any free hydrogen chloride remaining as a result of the halogen treatment. It may also, under some circumstances, be desirable to heat the chlorinated polymer at a low temperature with a basic material, such as alcoholic potash, aqueous calcium hydroxide, sodium carbonate solution, sodium bicarbonate, etc., to remove one or possibly more halogen atoms and thereby produce a further stabilized product. A difficultly volatile basic compound, preferably an aromatic amine such as monoethyl aniline or methyl naphthyl amine, may be added as a stabilizer (in proportions of 0.1 to 1% or so) to the finished halogenated hydrocarbon.

The products prepared according to the present invention are high molecular weight halogenated hydrocarbons and their physical properties depend upon the nature of the original material treated and the duration and type of treatment. These products may be used for a wide variety of purposes; for instance, they may be condensed with aromatic hydrocarbons in the presence of aluminum chloride, boron fluoride or other condensing agents, to produce materials suitable as lubricants or blending agents in lubricants, such as pour depressors, or they may be used for any other type of condensation reactions in which halogenated aliphatic hydrocarbons are used as one of the reactants.

Halogenated hydrocarbon polymers, prepared according to the invention, may be used in conjunction with suitable soft resins and pigments, with or without linseed oil, volatile solvents, etc., in the compounding or paints which are resistant to chemical and mechanical influences and also non-inflammable, or they may be compounded with various resins alone, such as those prepared from petroleum hydrocarbons by various known methods, in order to improve the properties of such resins.

Another field in which these high molecular weight halogenated polymers are useful is the preservation of wood by impregnation with wax. Ordinary wax-impregnated wood is subject to spotting by water but if a small amount, such as ½ to 10%, of, for instance, chlorinated polymerized isobutylene, containing 5 to 10% chlorine, is incorporated with wax, the spotting of the impregnated wood is greatly reduced, if not completely prevented. The halogenated polymers of the invention are useful as fire-resistant impregnating agents generally, for impregnating various types of porous or fibrous materials, such as wood, cloth, paper and various composition materials used for building purposes, etc.

These halogenated products, which can be prepared according to this invention, may frequently serve to advantage as solvents or plasticizers. For delustering artificial silk, these high molecular weight halogenated polymers may be mixed with an inert organic material of an oily or waxy nature, such as petroleum oil, petroleum jelly and paraffin wax, and the mixture added to solutions of artificial silk to be spun.

Many other uses will no doubt occur to those skilled in the art and it is an object of the present invention to claim broadly these high molecular weight halogenated products prepared from substantially saturated organic compounds having a structure represented by a long straight chain of carbon atoms with a plurality of alkyl side chains and containing a substantial proportion of halogen atoms incorporated according to this invention regardless of the purpose for which they are to be used.

The invention will be illustrated from the following examples:

*Example 1*

Chlorine gas is diffused at room temperature in ordinary diffused light, through a solution of carbon tetrachloride containing, dissolved therein, about 20% of a hydrocarbon polymer having a molecular weight of about 8,000 and prepared by polymerizing isobutylene at a temperature of −20° C. with boron fluoride as catalyst. When about 20% of chlorine has been combined chemically with the polymer the chlorination is stopped and the product is washed with water and the carbon tetrachloride removed by distillation.

The product of this experiment differs from chlorinated rubber in that (1) rubber containing small amounts of chlorine is unstable, while the present product is relatively stable, (2) no solid chlorinated products were obtained as in the chlorination of rubber, and (3) the present product is miscible with paraffin wax while chlorinated rubber is not.

The chlorinated polymer, for example, may also be used in compounding high viscosity index extreme pressure lubricants either alone or in conjunction with sulfur or sulfur compounds or other materials known to the art in preparing extreme pressure lubricants.

The saturated high molecular weight polymers may also be mixed with wax, resins, mineral and vegetable oils, chloraromatics, esters, and the like, prior to or after halogenation. When blended in mineral oils, the chlorinated polymer may be used in conjunction with oxidation inhibiting amines, oiliness agents, thickeners, sludge dispersers, pour inhibitors, soaps, bright stocks, white oils, etc.

Example 2

When the isobutylene polymer is of a low molecular weight (around 3,000) the direct chlorination is effected by passing chlorine gas through the polymer in the presence of very small amounts of iodine to catalyze the reaction. In this example no solvent is present and the resulting product requires only a slight carbonate washing to remove any of the remaining HCl.

Example 3

Chlorine gas is passed under pressure through vents in the bottom of a tower packed with broken porcelain or spiral packing; when the tower has become saturated with the chlorine gas a solution of isobutylene polymer in carbon tetrachloride is sprayed in at the top of the tower passing down through the chlorine gas and being removed at the bottom of the tower and pumped back to the top of the same tower or other similar towers and the contact repeated until the chlorine content has reached the required amount.

The gaseous mixture removed at the top is scrubbed free of HCl by passing through solid caustic soda and again passed in at the bottom of the tower. The carbon tetrachloride solution of chlorinated isobutylene polymer is washed free of HCl by a slight carbonate washing and the carbon tetrachloride removed by distillation.

Example 4

150 grams of Vistanex (12,000 molecular weight) were dissolved in 850 grams of carbon tetrachloride by heating (120–140° F.) and stirring for 1½ hours. After the Vistanex was completely dissolved, the solution was transferred to a separatory flask and 0.5 gram of iodine added. Chlorine gas was passed through the solution at a slow rate at room temperature (75–80° F.) by means of a small alundum thimble attached to a glass tube and suspended close to the stopcock end of the separatory flask. Chlorine was passed through the solution for 5½ hours and then discontinued over night (about 16 hours). The following morning the chlorine was again passed through the solution for eight hours, and then again shut off. The chlorine saturated material was allowed to stand over the weekend (60 hours).

A small sample (200 grams) of the carbon tetrachloride solution of the chlorinated product was placed in a filter flask, and the carbon tetrachloride distilled off at 200–210° F. (water bath) under laboratory vacuum pressure, after which carbon dioxide was blown through.

The product was a heavy viscous material, similar to the original Vistanex and having a slight pink color due to iodine present. The product shown by analysis to contain 24% chlorine was found to be completely soluble in petroleum ether and mineral lubricating oil.

In the removal of traces of carbon tetrachloride from the washed solution of chlorinated isobutylene polymer in carbon tetrachloride, almost the total amount of solvent is removed by mere distillation, either atmospheric or under reduced pressure, the remaining traces of solvent being removed by dissolving the practically solvent-free chlorinated product in close cut naphtha with a boiling range close to the boiling point of carbon tetrachloride (76° C.) and redistilling.

Many of the above steps may be combined.

Example 5

A 50 gram sample of hydro-rubber degraded during the hydrogenation to a molecular weight of about 15,000 (as estimated by viscosity measurement), was dissolved in sufficient carbon tetrachloride to make a total volume of 300 ccs. in a 500 cc. glass graduate and chlorine was passed in, in direct sunlight for about 3 hours. The reaction was rapid and at the end of the reaction the solution was not yellowed, thus showing no excess chlorine in solution. The chlorinated hydro-rubber was recovered by boiling in water to expel the carbon tetrachloride and was found to be stable, thermoplastic (plastic while hot and solidifying on cooling), very hard, horny, tough and slightly flexible. Two samples of it contained 58.8 and 59.9% of chlorine respectively. Also, a sample withdrawn after the first three hours of chlorination was examined and found to be a stable product.

Example 6

A 4% solution of hydro-rubber having a molecular weight of about 10,000 was made in carbon tetrachloride. The solution was exposed to sunlight and chlorine gas was passed in through a bubbler at a temperature ranging from room temperature up to about 35° C. or 40° C. The chlorination was continued for 3 or 4 hours until the addition of a small amount of petroleum ether caused cloud formation. It was found that the product contained about 10% of chlorine and was soluble in mineral lubricating oil.

This application is a continuation-in-part of application 749,072 filed October 19, 1934, and application 170,120 filed October 20, 1937.

It is not intended that the invention be limited to any of the specific examples given nor to any theories of the operation of the invention but in the appended claims it is intended to claim all inherent novelty in the invention as broadly as the prior art permits.

We claim:

1. Chlorinated hydro-rubber containing about 10 to 70% of chlorine.

2. A chlorine derivative of completely hydrogenated rubber having a molecular weight of about 10,000 to 50,000, said chlorine derivative containing about 30 to 60% of chlorine.

3. A very hard, tough, flexible and somewhat horny thermoplastic chlorine derivative of substantially saturated hydrogenated rubber containing about 10% to 70% of chlorine.

4. The process of preparing halogenated hydrocarbon products which comprises treating with a halogen, a hydrogenated rubber having a molecular weight of about 10,000 to 50,000 and having an iodine number below about 20 cgs.I/gm., said treatment with halogen being carried out to such an extent that the product contains substantially more halogen than is required to saturate the slight residual unsaturation of the hydrogenated rubber.

5. A halogenation derivative of a substantially saturated hydrogenated rubber, said derivative containing an excess of 1% of halogen, and a substantially greater amount of halogen than is necessary to saturate any slight unsaturation present in the hydrogenated rubber.

6. A halogenated derivative as described in claim 5, containing at least 10% of halogen.

7. The process of preparing chlorinated hydro-rubber which comprises dissolving a substantially saturated hydro-rubber having a molecular weight of about 10,000 to 50,000 in a solvent which is non-reactive with chlorine and reacting said hydro-rubber in solution at an elevated temperature and superatmospheric pressure with chlorine until substantially more than 1% of chlorine is combined in the chlorinated hydrorubber.

8. A process as described in claim 7, in which said solvent is a sulfur halide.

9. The process of preparing stable high molecular weight chlorinated hydrocarbon compounds containing from about 10% to 70% of chlorine, which comprises reacting a substantially saturated hydrogenated rubber having a molecular weight of about 10,000 to 50,000 with chlorine to the extent that the chlorine is chemically combined with the hydrogenated rubber by substitution for hydrogen constituents thereof with splitting out of hydrogen chloride, and continuing the reaction until about 10% to 70% of chlorine is chemically combined with the hydrogenated rubber.

10. The process as described in claim 9, in which the hydrogenated rubber is dissolved in an inert solvent and is reacted with the chlorine for a period of at least about 3 hours, in sunlight radiation at sufficiently low temperatures to prevent substantial breakdown of the hydrogenated rubber and of its chlorine derivative.

11. The process described in claim 9, in which the hydrogenated rubber is dissolved in carbon tetrachloride and is reacted with the chlorine at a temperature below about 40° C. in sunlight to form a stable, mineral oil-soluble, chlorine derivative of the hydrogenated rubber.

ARNOLD J. MORWAY.
FLOYD L. MILLER.